US012627648B2

(12) United States Patent
Mroczek

(10) Patent No.: US 12,627,648 B2
(45) Date of Patent: May 12, 2026

(54) SYSTEM AND A METHOD FOR DETERMINING AN ATTEMPT TO GAIN UNAUTHORIZED ACCESS TO A SYSTEM OR A SERVICE

(71) Applicant: Government of the United States as represented by the Secretary of the Air Force, Wright-Patterson AFB, OH (US)

(72) Inventor: Janek Mroczek, Barneveld, NY (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 58 days.

(21) Appl. No.: 18/802,010

(22) Filed: Aug. 13, 2024

(65) Prior Publication Data

US 2026/0052136 A1     Feb. 19, 2026

(51) Int. Cl.
H04L 9/40 (2022.01)
H04L 9/08 (2006.01)

(52) U.S. Cl.
CPC ............ H04L 63/08 (2013.01); H04L 9/0869 (2013.01); H04L 63/10 (2013.01)

(58) Field of Classification Search
CPC ........ H04L 63/08; H04L 9/0869; H04L 63/10
See application file for complete search history.

(56) References Cited

U.S. PATENT DOCUMENTS

| | | | |
|---|---|---|---|
| 2017/0187725 A1* | 6/2017 | Lahtiranta | H04L 63/083 |
| 2019/0158515 A1* | 5/2019 | Visbal | H04L 63/14 |
| 2019/0166159 A1 | 5/2019 | Avrahami et al. | |
| 2021/0112096 A1* | 4/2021 | Avrahami | G06N 20/00 |
| 2024/0064517 A1 | 2/2024 | Yapici et al. | |
| 2024/0323016 A1* | 9/2024 | Lambert | H04L 9/0841 |

FOREIGN PATENT DOCUMENTS

| | | |
|---|---|---|
| JP | 2005293338 A | 10/2005 |
| KR | 20190037489 A | 4/2019 |

OTHER PUBLICATIONS

Machine Translation JP2005293338.
Machine Translation KR20190037489.

* cited by examiner

*Primary Examiner* — Normin Abedin
(74) *Attorney, Agent, or Firm* — AFMCLO/JAZ; John T. Addicks

(57) ABSTRACT

An authentication system. The authentication system includes at least one memory and at least one processor coupled with the at least one memory. Executable instructions for the processor generate and send a false verification code to an authorized user.

20 Claims, 5 Drawing Sheets

600

610

Use this true verification code to log in: 582492. If someone asks for your verification code and you suspect fraud, give them this false verification code: 295429.

612

602

610

Someone using your credentials is requesting access. If this is you, please use this true verification code: 582492. If someone asks you for a verification code provide this false verification code: 295429.

612

SYSTEM AND A METHOD FOR DETERMINING AN ATTEMPT TO GAIN UNAUTHORIZED ACCESS TO A SYSTEM OR A SERVICE

RIGHTS OF THE GOVERNMENT

The invention described herein may be manufactured and used by or for the Government of the United States for all governmental purposes without the payment of any royalty.

TECHNICAL FIELD

The disclosure generally relates to the field of information systems, cyber security, and banking systems, more particularly, relates to systems using verification codes or personal identification number for authorized access.

BACKGROUND

System login verification codes add additional security when accessing systems, such as an information system or computer system. In general, a system that uses verification codes to authenticate users will send a verification code via an authentication application, a text message service to a phone number, or to an e-mail. An authentication system may also use a regular voice call to provide a verification code.

Unauthorized users of systems often try to gain access to computer systems, applications (apps) and other secure electronic systems. Unauthorized users who gain access to computer systems can perform various actions, such as, but not limited to, locking out authorized users and demanding ransom, gathering any information available on the information system, or committing identity and data theft. Such unauthorized access causes business disruptions, as well as cost. IBM's most recent annual Cost of a Data Breach Report revealed the global average cost of a data breach reached $4.88 million in 2024, as breaches grow more disruptive and further expand demands on cyber teams.

There is a continuing need for methods and systems for ensuring only authorized users access computer systems.

BRIEF DESCRIPTION OF THE DRAWINGS

The accompanying drawings illustrate only some aspects of the disclosure and are not to be considered limiting of the disclosure scope.

Figure 1:
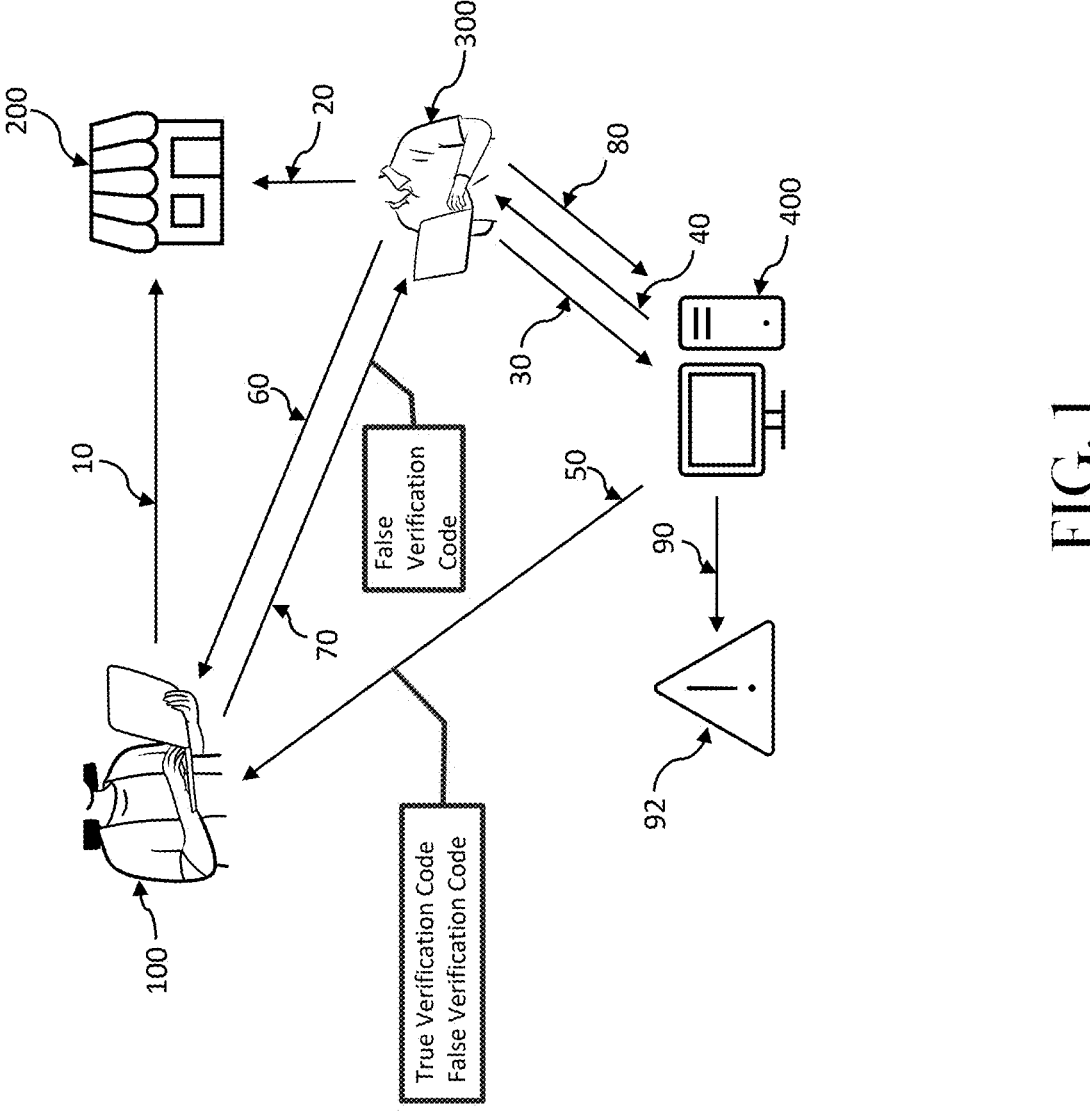
FIG. 1 is a diagram illustrating an example operation of an authentication system.

The embodiments set forth in the drawings are illustrative in nature and not intended to be limiting. Moreover, individual features of the drawings and the disclosure will be more fully apparent and understood in view of the detailed description.

DETAILED DESCRIPTION

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific FIG. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The disclosed system and a method for an authentication system involves the use of two verification codes that can be used to determine the type of a user attempting to access a system. One code is a true verification code suitable for granting access to a system or service. The other code is a false verification code that is not suitable for granting access to a system or service and can inform the server that an unauthorized user (e.g., a scammer) is trying to gain access and the server may perform more stringent actions upon receiving a false verification code. The false code can also be used to trigger an alert, which can include informing authorities of an unauthorized attempt to gain access to the system. This method and system permit the identification of either an authorized user or an unauthorized user to a system owner or administrator. In an example embodiment, during an attempted authentication process, a system (or service) can send a true verification code and a false verification code to an authorized user. If the authorized user is asked by another user, whom the authorized user suspects might be a fraudster, a scammer, or otherwise unauthorized, the authorized user can send to the unauthorized user the false verification code. If the false verification code is used, the system can determine that an unauthorized user is attempting to gain access to the system and the server can take appropriate action.

Figure 4:
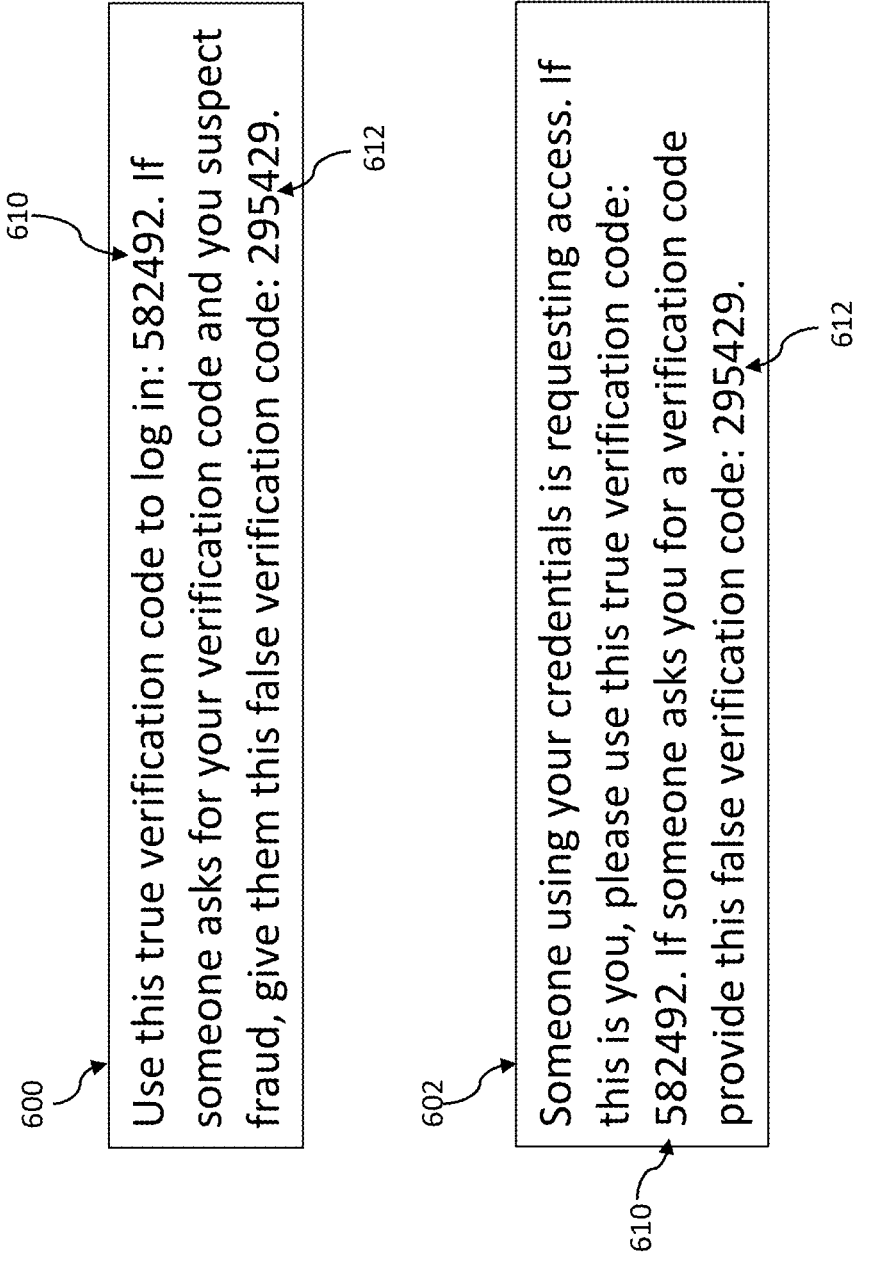
FIG. 4 is a diagram illustrating examples of a message sent from an authentication system to an authorized user.

Referring to FIG. 1, there is indicated an example embodiment of the method and system of the disclosure. Illustrated in FIG. 1 is an attempt by a scammer to gain unauthorized access to a system or service. In the illustrated example, at 10 an authorized user 100 of a system (or service) 400 posts a product for sale on an online marketplace 200. The online marketplace 200 can be, for example, Craigslist or Facebook Marketplace. At 20 an unauthorized user (and potential scammer) of the system 400 responds to the post at the online marketplace 200 and learns certain information related to the authorized user 100, such as a name, an address, an email address, a phone number, and the like. At 30 the unauthorized user 300 attempts to gain access to the system 400 using the information learned from the authorized user 100. At 40 the system 400 requests a verification code from the unauthorized user, and simultaneously at 50 sends a true verification code (here, and throughout, a true verification code 610, an example of which is shown in FIG. 4) and a false verification code 612, an example of which is shown in FIG. 4) to the authorized user 100. As shown in FIG. 4, the true and false verification codes can be sent to the authorized user with instructions for use.

At 60 the unauthorized user 300, perhaps hoping to persuade the authorized user of a legitimate reason for access, requests a verification code from the authorized user 100. The authorized user 100, perhaps suspecting that this might be a scam, at 70 sends the false verification code to the unauthorized user 300. At 80 the unauthorized user attempts access to the system 400 using the false verification code. At 90, the authentication system 400, being provided with a false verification code, prevents the unauthorized user access to the system, and can issue an alert 92. The alert 92 may result in one or more of various actions, including, but not limited to, quarantining the unauthorized attempt at access, blacklisting the IP address of the unauthorized user 300, informing the ISP of the unauthorized user 300, informing law enforcement, and the like.

Figure 2:
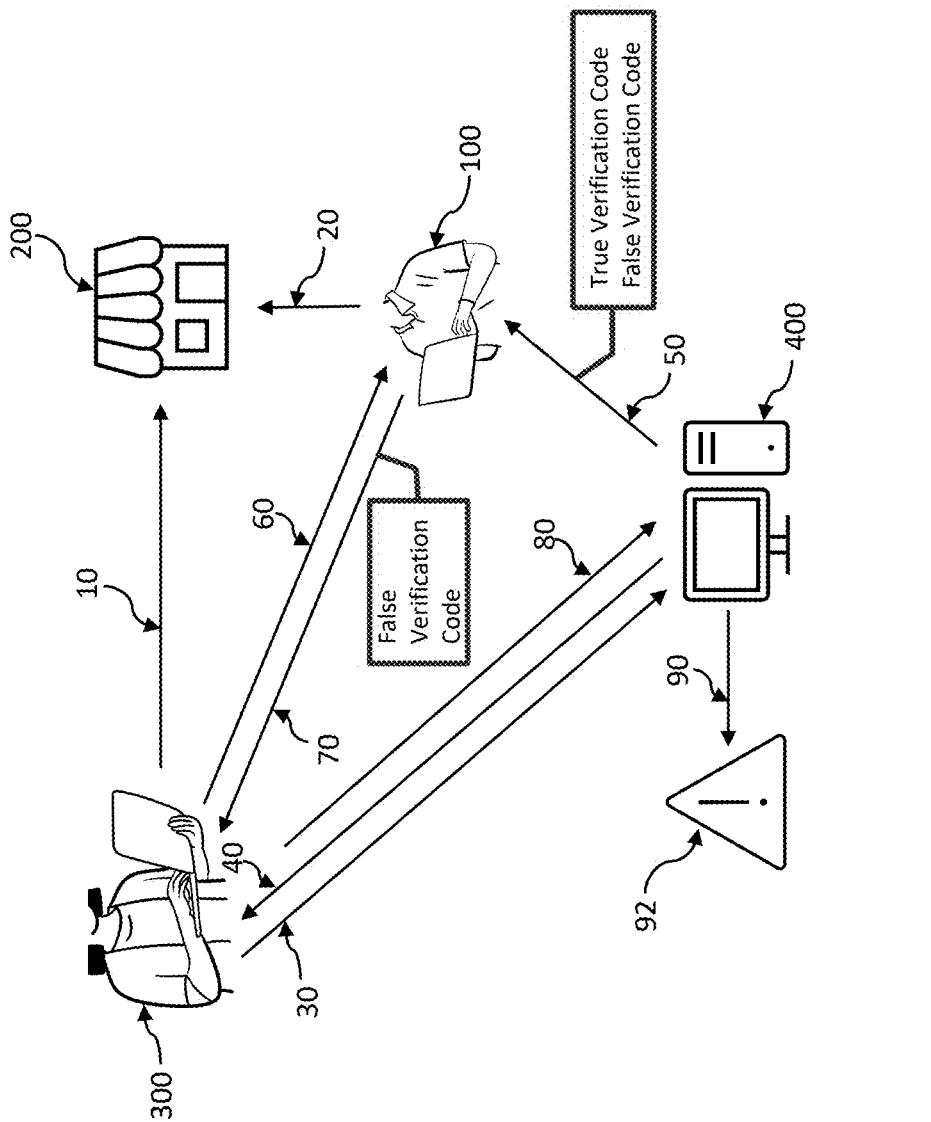
FIG. 2 is a diagram illustrating an example operation of an authentication system.

Referring to FIG. 2, there is indicated another example embodiment of the method and system of the disclosure. At 10 in FIG. 2 an unauthorized user 300 posts a product or service for sale on an online marketplace 200. The product or service may be fake, as the purpose is simply to gain information from persons inquiring about the product or service. At 20 an authorized user 100 of system 400 makes an online inquiry about the product or service. The unauthorized user 300 can gain information about the authorized user 100, such as a name, an address, an email address, a phone number, and the like. At 30 the unauthorized user 300 attempts to gain access to the system 400 using the information learned from the authorized user 100. At 40 the system 400 requests a verification code from the unauthorized user 300, and simultaneously at 50 sends a true verification code and a false verification code to the authorized user 100. As shown in FIG. 4, the true and false verification codes can be sent to the authorized user with instructions for use.

At 60 the unauthorized user 300, perhaps hoping to persuade the authorized user 100 of a legitimate reason for access, requests a verification code from the authorized user 100. The authorized user 100, perhaps suspecting that this might be a scam, at 70 sends the false verification code to the unauthorized user 300. At 80 the unauthorized user attempts access to the system 400 using the false verification code. At 90, the authentication system 400, being provided with a false verification code, prevents the unauthorized user access to the system, and can issue an alert 92. The alert 92 may result in one or more of various actions, including, but not limited to, quarantining the unauthorized attempt at access, blacklisting the IP address of the unauthorized user 300, informing the ISP of the unauthorized user 300, informing law enforcement, and the like.

For situations where the authorized user and the unauthorized user are physically collocated, such as at an Automated Teller machine (ATM), the false verification code, e.g., in the form of a fake Personal Identification Number (PIN), can be established a priori, for example during obtaining the debit or credit card. The false verification code can also be created or changed after the debit or credit card has already been issued. If the authorized user is being forced to withdraw funds from the ATM, the authorized user can use the false verification code, or provide it to an unauthorized user for attempted access to the ATM. Once the false authorization code is entered, various actions can be taken, including, but not limited to, informing the bank of the unauthorized attempt, informing law enforcement, and the like. Other banking and monetary applications are contemplated. For example, the authentication system may use a false verification code to determine unauthorized access or transfer of funds when related to payment applications and crypto currency.

Another way an unauthorized user may try to obtain a verification code from the authorized user, is to use scare tactics. For example, the unauthorized user claims to be an agent of a company or an organization, for example of the Internal Revenue Service, and claims that the authorized user must resolve an issue, or an action of dire consequences will be taken. During this fake resolution, the unauthorized user will try to convince the authorized user to send a verification code, or make a payment via debit card, credit card, gift card, payment application, or crypto currency. In another example of a scare tactic, the unauthorized user will claim that the victim's family member has been arrested and that a payment needs to be made to release the arrested family member. Another tactic an unauthorized user might use to gain unauthorized access is to claim that they are from a customer service of a company or service, and that the unauthorized user needs to verify account information of the authorized user. In this example, the unauthorized user will ask the authorized user to provide a verification code, received from an authentication system, in ordered to verify the account. In each of these examples the method and system of the disclosure can prevent unauthorized access and/or alert authorities to unlawful attempts to do so.

Figure 3:
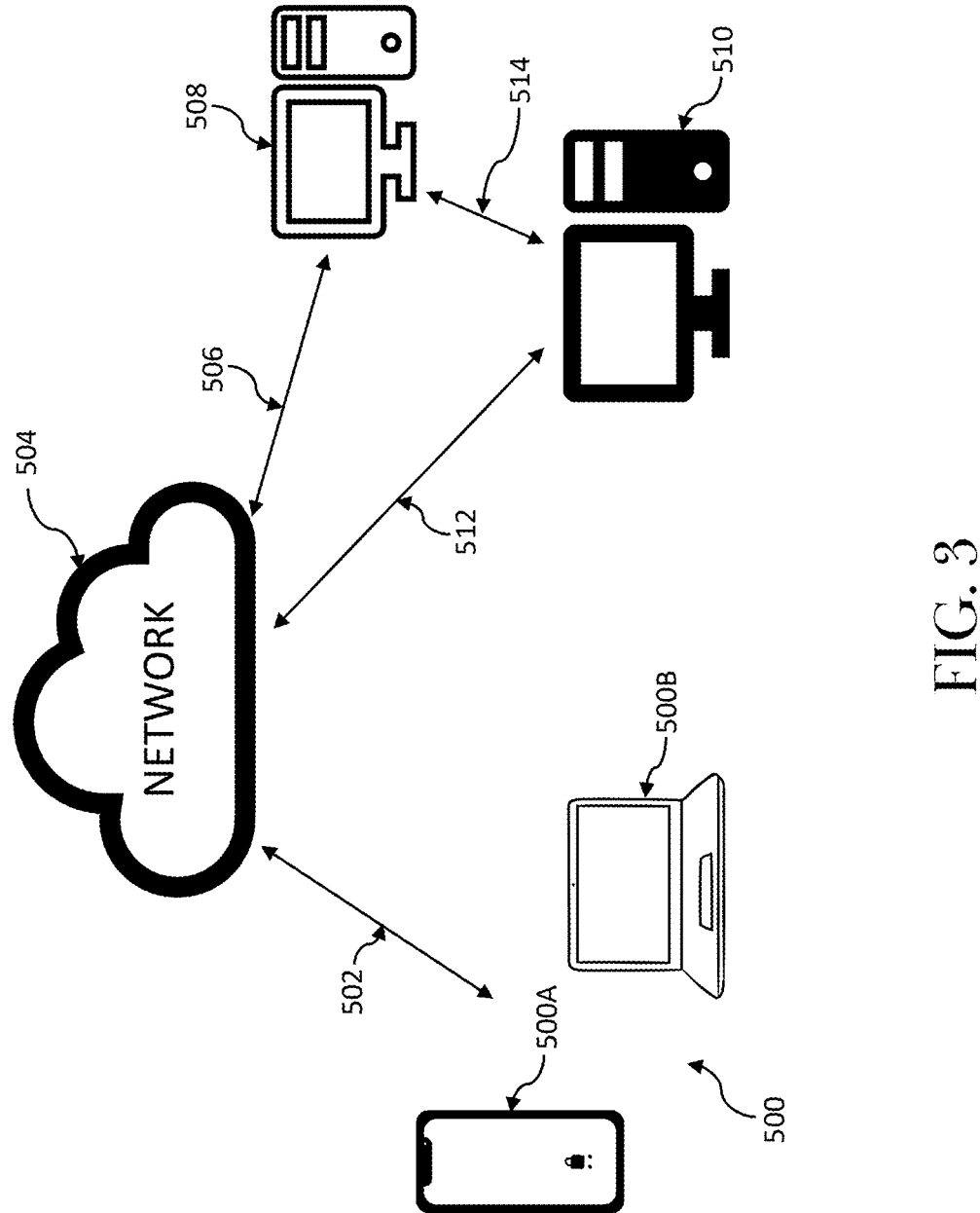
FIG. 3 is a diagram illustrating an example of networked computer systems.

In general, verification codes can utilize numbers, letters, symbols, and the like. The verification codes can be sent via text message (e.g., SMS), e-mail, authentication application ("app"), or telephone call. The method and system of the present disclosure utilizes servers, computers, mobile devices, which can be networked computer systems. As depicted in FIG. 3, for example, a user device 500, which can be any of known user devices, including a mobile phone 500A or a laptop computer 500B, may be connected via a datal link 502 to a larger network 504. An authentication system 510 may be connected to a larger network 504 via data link 512. An authentication system 510 may also be connected directly to a data or service system 508 via a data link 514. A data or service system 508 may be connected to a network 504 via data link 506. A user device 500 may be a device that is being used by an authorized user or an unauthorized user. The data links 502, 506, 512, and 514 may be wired, wireless, optical, or any combination thereof. The network 504 may be a local area network (LAN), wide area network (WAN), or any network interconnecting devices.

Referring now to FIG. 4 there is shown example embodiments of sending to an authorized user two verification codes. As depicted at 600, a text or email message can include instructions for utilizing a true verification code 610 and a false verification code 612. Likewise, as depicted at 602, an authorized user can be instructed via text or email to utilize utilizing a true verification code 610 and a false verification code 612. Messages at 600 and 602 can include any form of text, audio, visual, and combinations thereof.

Figure 5:
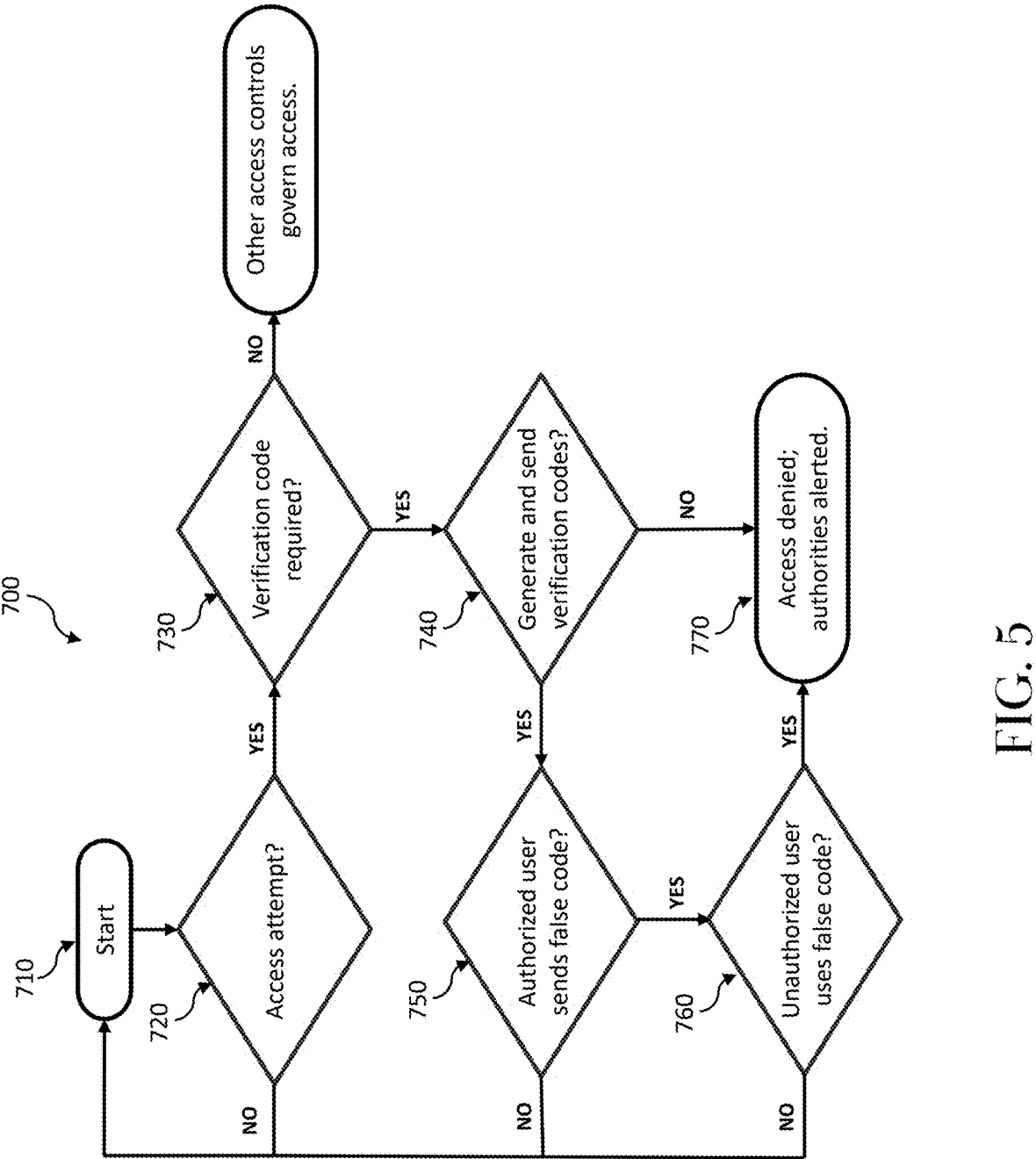
FIG. 5 is an example flow chart of an embodiment of the disclosure.

Referring to FIG. 5 there is shown a flow chart 700 of an embodiment of the method and system. Starting at 710, at 720 the system queries if access to a restricted computer system is attempted. If no, the method loops to the start 710. If yes, at 730 is a verification code required for authorized access? If no, then other access controls govern that are outside of the scope of this disclosure. If yes, at 740 the question becomes whether to send a verification code. If no, then access is denied at 770. If yes, a true verification code and a false verification code are sent to the authorized user. At 750, the authorized user can either send a false verification code to an unauthorized user requesting it, or not. If not, then the session ends and loops back to start 710. If yes, at 760 the unauthorized user can attempt access with a false verification code. If not attempted, the session ends and loops back to start 710. If attempted, at 770 access is denied, and an alert can be initiated.

It shall be understood that an authentication system may perform checking if a true verification code or a false verification code has been provided in any chronological order. For example, an authentication system may check if a false verification code has been provided before checking if a true verification code has been provided. It shall be understood that checking for the type of a verification code that has been provided is not required to have a check for one type of a verification code to be immediately followed by a check for another type of a verification code. The checks for the type of the type of a verification code may be separated by other procedures performed by an authentication system. It shall be understood that checking for the type of a verification code that has been entered may be performed sequentially or in parallel.

In this disclosure, an authentication system is a system that interacts with a user to authenticate the user. An authentication system may be a stand-alone system or part of another system or systems. In this disclosure, a system or a computer system, or an information system, or a banking system are interchangeable. The system may be an information system, computer system, or any system that requires a user to be authenticated to gain access to a system. An authorized user is a user that has authority to access an information system, or a service.

All documents cited in the Detailed Description of the Disclosure are, in relevant part, incorporated herein by reference; the citation of any document is not to be construed as an admission that it is prior art with respect to the present disclosure. To the extent that any meaning or definition of a term in this written document conflicts with any meaning or definition of the term in a document incorporated by reference, the meaning or definition assigned to the term in this written document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An authentication system, comprising:
   at least one memory; and
   at least one processor coupled with the at least one memory; and
   executable instructions for the processor to:
   generate a false verification code, the false verification code configured to inform a system configured to communicate with the authentication system for authentication that a provider of the false verification code is not an authentic user of the system; and
   send a message including the false verification code to an authorized user, the message including an indication that the false verification code is false.

2. The authentication system of claim 1, further comprising executable instructions for the processor to:
   generate a true verification code, the true verification code configured to inform the system configured to communicate with the authentication system for authentication that a provider of the true verification code is an authentic user of the system; and
   send a message including the true verification code to the authorized user, the message including an indication that the true verification code is true.

3. The authentication system of claim 1, wherein the false verification code and the true verification code are distinct codes generated with a random code generator.

4. The authentication system of claim 1, further comprising a random code generator to generate the false verification code.

5. The authentication system of claim 1, wherein the authentication system includes executable instructions to check if the false verification code has been provided to the authentication system.

6. The authentication system of claim 1, wherein the authentication system determines from receipt of the false verification code that an attempt to gain unauthorized access to a system is in progress and starts an alert procedure.

7. The authentication system of claim 6, wherein the alert procedure includes informing authorities.

8. A system comprising:
   at least one memory; and
   at least one processor coupled with the at least one memory; and
   executable instructions for the processor to:
   receive a request for a verification code from a user;
   generate a false verification code based on the request for a verification code, the false verification code configured to inform the system that a provider of the false verification code may not be an authentic user of the system;
   send a message including the false verification code to the user, the message including an indication discernable by the user whether the verification code is false; and
   detect the false verification code based on receipt of the false verification code.

9. The authentication system of claim 8, further comprising executable instructions for the processor to generate and send a true verification code to the user.

10. The authentication system of claim 8, further comprising executable instructions for the processor to generate and send a true verification code and a false verification code to the user based on a user request.

11. The authentication system of claim 8, further comprising a random code generator to generate a verification code.

12. The authentication system of claim 8, wherein the authentication system includes executable instructions to check if the false verification code has been provided to the authentication system.

13. The authentication system of claim 8, wherein the authentication system determines from receipt of the false verification code that an attempt to gain unauthorized access to a system is in progress and starts an alert procedure.

14. The authentication system of claim 13, wherein the alert procedure includes informing authorities.

15. A method for determining an unauthorized user of a system, comprising:

providing an authentication system, the authentication system comprising:

at least one memory; and at least one processor coupled with the at least one memory; and executable instructions for the processor to:

generate a true verification code and a false verification code; and send a message including the true verification code and the false verification code to a user;

and detecting receipt of the false verification code.

16. The method for determining an unauthorized user of a system of claim 15, including the step of sending, by the authorized user, the false verification code to another user.

17. The method for determining an unauthorized user of a system of claim 15, including the step of sending, by an unauthorized user, the false verification code.

18. The method for determining an unauthorized user of a system of claim 15, including the step of alerting authorities of receipt of a false verification.

19. The method for determining an unauthorized user of a system of claim 15, including the step of determining the IP address of a user using a false verification code.

20. The method for determining an unauthorized user of a system of claim 15, including the step of blocking access of a user using a false verification code.

* * * * *